US011267037B2

(12) United States Patent
Angerer et al.

(10) Patent No.: US 11,267,037 B2
(45) Date of Patent: Mar. 8, 2022

(54) WORKPIECE PROCESSING MACHINE AND METHOD FOR OPERATING THE WORKPIECE PROCESSING MACHINE

(71) Applicant: TRUMPF Maschinen Austria GmbH & Co. KG., Pasching (AT)

(72) Inventors: Gerhard Angerer, Altenberg (AT); Klemens Freudenthaler, Linz (AT); Florian Hausmann, Traun (AT); Matthias Hoerl, Linz (AT); Nenad Kovjenic, Linz (AT); Florian Maier, Leonding (AT); Verena Steininger, Linz (AT); Helmut Theis, Pfarrkirchen (AT); Manfred Waldherr, Linz (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 426 days.

(21) Appl. No.: 16/317,131

(22) PCT Filed: Jul. 26, 2017

(86) PCT No.: PCT/AT2017/060188
§ 371 (c)(1),
(2) Date: Jan. 11, 2019

(87) PCT Pub. No.: WO2018/018058
PCT Pub. Date: Feb. 1, 2018

(65) Prior Publication Data
US 2019/0232357 A1 Aug. 1, 2019

(30) Foreign Application Priority Data
Jul. 26, 2016 (AT) .............................. A 50677/2016

(51) Int. Cl.
*B21D 43/26* (2006.01)
*B21D 5/00* (2006.01)
(Continued)

(52) U.S. Cl.
CPC ............. *B21D 43/26* (2013.01); *B21D 5/002* (2013.01); *B21D 5/02* (2013.01); *B21D 43/003* (2013.01);
(Continued)

(58) Field of Classification Search
CPC ...... B21D 43/26; B21D 43/003; B21D 5/002; B21D 5/02; B21D 55/00; F16P 3/142
See application file for complete search history.

(56) References Cited

U.S. PATENT DOCUMENTS

| 6,316,763 | B1 | 11/2001 | Appleyard et al. | |
| 7,286,895 | B2 * | 10/2007 | Krieg | B21D 55/00 100/348 |

(Continued)

FOREIGN PATENT DOCUMENTS

| AT | 514 292 A1 | 11/2014 |
| CN | 85101057 A | 1/1987 |

(Continued)

OTHER PUBLICATIONS

International Search Report of PCT/AT2017/060188, dated Nov. 16, 2017.
(Continued)

*Primary Examiner* — Teresa M Ekiert
(74) *Attorney, Agent, or Firm* — Collard & Roe, P.C.

(57) ABSTRACT

The invention relates to a workpiece processing machine (1), and to a method for operation of a workpiece processing machine (1). The workpiece processing machine (1) comprises an automatically adjustable stop finger (17), and has, for monitoring adjustment movements of the stop finger (17), a monitoring device (36, 37, 38) that comprises an illuminating device (36) and at least one optical detection device (37). In operation of the workpiece processing machine (1), during an automatically controlled adjustment (Continued)

Figure 1:
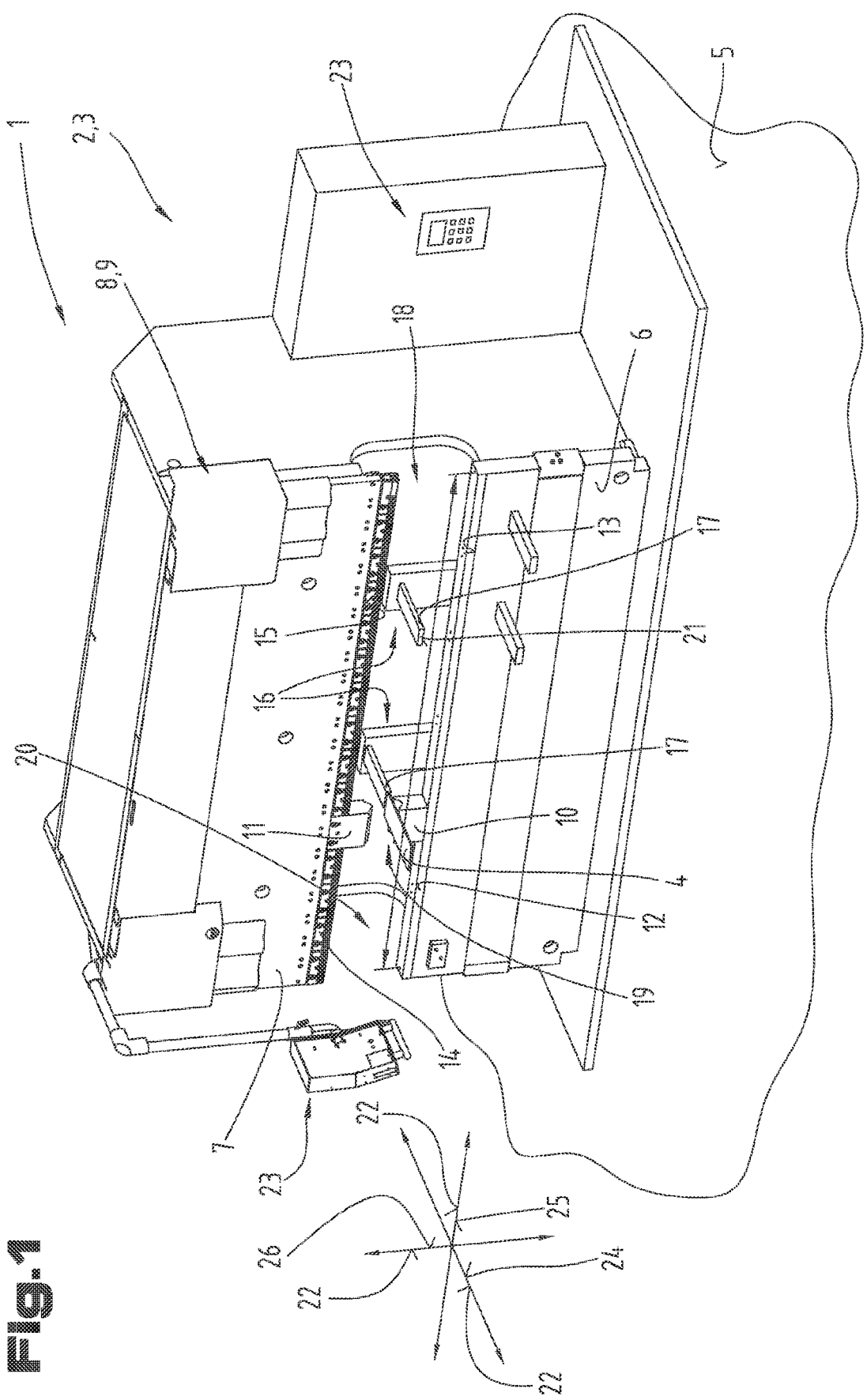

movement of the stop finger (17), a light beam (38) is radiated into an area ahead of the stop finger (17) in the adjustment direction. Upon detection of a first light image (43) projected onto an object surface (42) by the first light beam (38), a safety measure is triggered.

34 Claims, 3 Drawing Sheets

(51) Int. Cl.
    *B21D 5/02*     (2006.01)
    *B21D 43/00*     (2006.01)
    *B21D 55/00*     (2006.01)
    *F16P 3/14*     (2006.01)

(52) U.S. Cl.
    CPC .............. *B21D 55/00* (2013.01); *F16P 3/142* (2013.01); *F16P 3/144* (2013.01)

(56) References Cited

U.S. PATENT DOCUMENTS

| | | |
|---|---|---|
| 8,314,393 B2 * | 11/2012 | Garland .................. G01D 3/08 250/342 |
| 2010/0012821 A1 | 1/2010 | Hufnagel et al. |
| 2011/0138869 A1 | 6/2011 | Reiter et al. |
| 2013/0160508 A1 | 6/2013 | Fischereder et al. |
| 2013/0269962 A1 | 10/2013 | Fiessler |

FOREIGN PATENT DOCUMENTS

| | | |
|---|---|---|
| CN | 1211307 A | 3/1999 |
| CN | 101652598 A | 2/2010 |
| CN | 101668597 B | 6/2012 |
| CN | 103124602 A | 5/2013 |
| DE | 10 2010 016646 A1 | 11/2010 |
| EP | 1 681 111 A1 | 7/2006 |
| EP | 2 586 544 A1 | 5/2013 |
| EP | 2 644 962 A1 | 10/2013 |
| JP | H09-253753 A | 9/1997 |
| JP | 2001-025823 A | 1/2001 |
| JP | 2001-058213 A | 3/2001 |
| JP | 2004-106023 A | 4/2004 |
| JP | 2005-326324 A | 11/2005 |
| JP | 2006-061959 A | 3/2006 |
| JP | 2013-158787 A | 8/2013 |
| JP | 2015-044232 A | 3/2015 |
| JP | 2016-117132 A | 6/2016 |
| WO | 2012/151600 A1 | 11/2012 |

OTHER PUBLICATIONS

Japanese Office Action in 2019-503958, dated Nov. 2, 2021, with English translation.

* cited by examiner

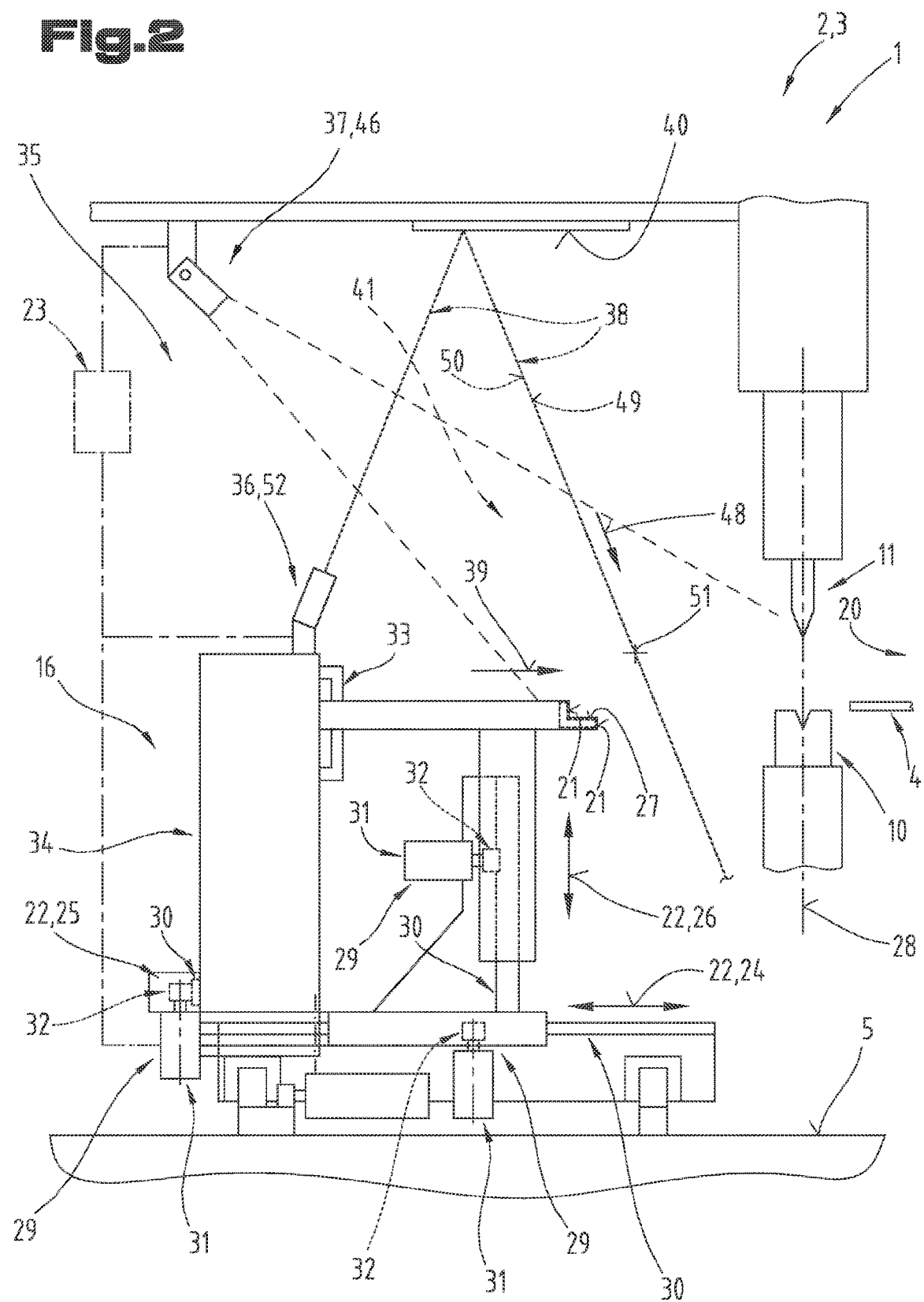

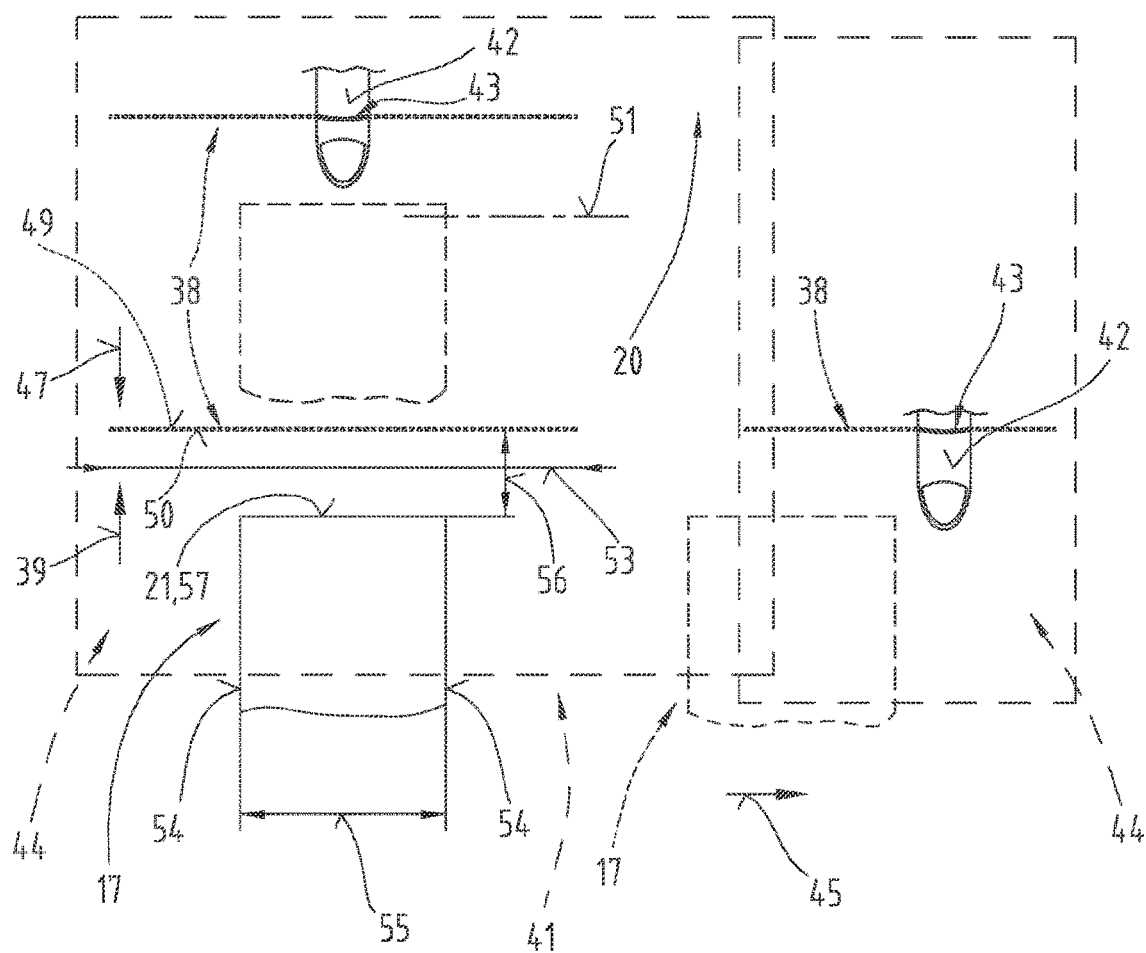

WORKPIECE PROCESSING MACHINE AND METHOD FOR OPERATING THE WORKPIECE PROCESSING MACHINE

CROSS REFERENCE TO RELATED APPLICATIONS

This application is the National Stage of PCT/AT2017/060188 filed on Jul. 26, 2017, which claims priority under 35 U.S.C. § 119 of Austrian Application No. A 50677/2016 filed on Jul. 26, 2016, the disclosure of which is incorporated by reference. The international application under PCT article 21(2) was not published in English.

The invention relates to a method for operation of a workpiece processing machine, and to a workpiece processing machine according to the wording of the patent claims.

In the technical field of workpiece processing, automatically controlled processing machines are generally used nowadays. To improve productivity with such machines, usually as many machine components as possible are adjusted or displaced automatically under the control of a control device. A typical and frequently used example of such control is so-called CNC control (Computerized Numeric Control; computerized numeric control).

In such automated or CNC-controlled processes, machine components are adjusted, for example along driven displacement or adjustment axes, into predeterminable or preprogrammable positions in the respective machine coordinate system. However, such computer-controlled or program-controlled adjustments of machine components involve an inherent hazard potential on account of the automation of the displacement or adjustment movements that are performed. For example, there is always a certain risk of collision of machine components with one another or with other objects, which can result in damage to a machine involved. Such collisions are possible because of, for example, faulty programming specification of target or approach positions, improper operation, or in the case of operating errors, unforeseen or erroneously placed obstructions, etc.

In partially or fully automated processes, the safety of operating staff or the safety of persons in general must be considered above all else. Especially in the case of adjustment or displacement movements performed automatically, a certain risk potential exists with regard to a collision of a displaced or adjusted machine component with the operator or with a person's body part, for reasons including inattentiveness of an operator, for example. In the worst case, serious injuries can be caused by such collisions, especially in the case of automated displacement or adjustment of heavy machine components or machine components driven by powerful drive elements.

Some solutions for monitoring of partially or fully automated processes were already proposed in the past. In JP 2006061959 A, for example, monitoring of the work area of a press brake is proposed. This document discloses a method in which a laser line in the bending area of the press is projected onto a flat surface of an already positioned workpiece, and this area is monitored with a camera. If an object or an obstruction, for example a person's hand, enters the area between the line light source and the workpiece surface, due to a visually detectable interruption of the light line projected onto the workpiece this obstruction can be recognized by means of the camera. After detection or recognition of an obstruction in the monitoring area, lowering of the press brake punch can be stopped immediately in this case. However, automated adjustment movements of a machine component cannot be monitored by this method. In particular, the adjustment movement of a stop finger cannot be monitored by this means.

So-called stop devices are adjustable or displaceable machine components that commonly are automatically controlled in workpiece processing machines. Such stop devices are primarily used for position control of a workpiece to be processed in a working position. Usually such stop devices have one or more adjustable or displaceable stop fingers with contact surfaces and/or support surfaces, on which surfaces a workpiece can be placed against the stop finger or placed on the stop finger for positioning. For the intended positioning of the workpieces in this case, such stop fingers are first adjusted into a specific stop position in proper operation. Then a workpiece to be processed can be positioned on the stop finger automatically, but often can also be positioned manually by an operator. Especially in bending machines, such stop devices often are implemented as so-called backgauges.

Solutions exist for avoiding collisions of such a stop finger with other objects in the course of an automatically controlled displacement movement, in which the speed of movement of a stop finger is sharply reduced, especially upon approach to the stop position or target position, and/or the adjustment movement is performed with reduced drive power upon approach to the stop position. In addition, it was proposed in the past to stop an automated adjustment movement in the region of approach to the stop position, and to wait until after intentional release by an operator to perform the final, driven adjustment of the stop finger into the stop position. Sensor-based solutions were also proposed in order to monitor an automated adjustment of a stop finger, as for example monitoring of the power consumption of a drive element for the stop finger.

In WO 2012/151600, a sensor arrangement is disclosed for monitoring of an automatically controlled approach movement of a stop finger into a stop position along a driven CNC axis. The sensor arrangement here can comprise a sensor element attached to the stop finger. Mechanical contact switches, force measurement elements, and proximity switches attached to the stop finger itself are proposed. Alternatively, a camera can also be used in conjunction with an object or structure recognition system for structural recognition of certain objects. Each of these known sensor systems suffers from disadvantages, however, for example late detection of an obstruction that does not occur before contact, imprecise recognition, limited detection range, or they require considerable computational effort for the recognition of obstructions.

In the technical field of workpiece processing machines, there is thus a need for further improvement with regard to the monitoring of automatically controlled displacement movements of stop fingers.

The task of the present invention was thus to provide an improved method for operating a workpiece processing machine, as well as a corresponding workpiece processing machine.

This task is accomplished by a method for operating a workpiece processing machine, and by a workpiece processing machine, according to the claims.

The method for operating a workpiece processing machine, in particular a bending machine, comprises automatically controlled adjustment or displacement of at least one stop finger of a stop device along at least one driven displacement or adjustment axis, for example a CNC axis, into a stop position provided for positioning of a workpiece to be processed.

In addition, the method comprises positioning of the workpiece by placement of the workpiece against a contact surface of the stop finger.

It is essential that, during an automatically controlled displacement or adjustment movement of the stop finger along the at least one adjustment axis, a first light beam is radiated into an area ahead of the stop finger in the adjustment direction, by means of an illuminating device motion-coupled to the stop finger, along the at least one adjustment axis.

In addition, a monitoring area for adjustment movements of the stop finger is monitored by means of at least one stationary optical detection device. The at least one optical detection device is designed here for detection of a first light image projected by the first light beam onto an object surface. In the event of detection of a first light image projected by the first light beam onto an object surface, an automatically controlled safety measure is immediately initiated or triggered.

By means of the measures proposed, a method for operating a workpiece processing machine that is improved in terms of recognition and safety can be provided. As a result of the measures specified, it is possible to detect, quickly and with reliable recognition, obstructions such as a human hand or finger in the adjustment area of the stop finger, in particular in the adjustment direction of the stop finger that is especially safety-relevant, in which adjustment direction there is an especially high risk of collision with obstructions. There is no need here for complex computing operations for object or structure recognition that cause time delays, and an extended, in principle unlimited, area of the workpiece processing machine can nevertheless be monitored for displacement movements of a stop finger with regard to obstructions. Moreover, it is possible to forego measures that delay cycle time, such as a reduction of the displacement or adjustment speed upon approach to the stop position or a reduced-force approach of the stop finger, without it being necessary to make compromises with regard to safety, especially with regard to the safety of persons. In this way, the processing of the workpieces can be performed with the shortest possible cycle times or runtimes, and thus with the highest possible productivity. Furthermore, a collision of the stop finger during an automatically controlled adjustment movement can not only be lessened by the proposed measures of the method, it can in principle be prevented entirely.

The specified measures can be used especially advantageously for the operation of bending machines, in particular for the operation of brake press machines or press brakes, since automatically controlled stop fingers are commonly used with such machines.

As a safety measure, prompt stopping of the adjustment movement of the stop finger can be triggered, for example, or even an immediate shutdown of the entire workpiece processing machine can be initiated. Alternatively and/or in addition, a warning signal or alarm can be triggered, for example.

The first light beam emitted by the illuminating device can be composed, for example, of a light cone, light cylinder, or other light beam structure, through which light beam structure a circular or elliptical area or a circular or elliptical line, for example, can be projected as the first light image onto an object surface located in the beam path. Basically, any suitable optical elements can be used in combination with the illuminating device to produce the light beam as long as it is ensured that the light beam can be radiated into an area ahead of the stop finger during an adjustment movement without a first light image being created on a surface of the machine or a machine component.

It is essential here that the first light image on a surface can be recognized as quickly as possible and with reliable recognition by the at least one optical detection device. In particular, the light emitted by the illuminating device can be monochromatic. In this context, the at least one optical detection device can be designed, for example, specifically for reliable recognition or detection of the light or light beam emitted by the illumination device, in particular for the most reliable detection possible of light with the radiated wavelength.

In principle, it is of course possible that multiple monitoring areas are provided for monitoring of the adjustment movements of stop fingers or for detection of obstructions. To this end, multiple detection devices can be arranged on the workpiece processing machine. Multiple monitoring areas of individual optical detection devices can be computationally combined into one extended monitoring area in this case. As a result, the most continuous possible monitoring of the adjustment movements of the stop finger in the area of the entire workpiece processing machine can be achieved even when design elements of the machine that hinder detection are present, such as struts and the like. If need be, it is possible to forego monitoring for areas of the workpiece processing machine that pose no risks in regard to safety.

In an improvement of the method, it can be provided that the illuminating device is adjusted with the stop finger in a motion-coupled manner along at least two displacement or adjustment axes.

By this means, it can be achieved in a simple way that the first light beam is radiated into the area ahead of the stop finger during an adjustment movement of the stop finger along the at least two adjustment axes. For this purpose, the illuminating device can, for example, be arranged or mounted on a surface of the stop device, for instance on a bracket. As a result, positioning errors with regard to the beam path of the first light beam into the area ahead of the stop finger in the adjustment direction can also be at least largely prevented. In the case of operating a bending machine, in particular a press brake, movement coupling of the illuminating device along two adjustment axes is especially useful, because automated adjustment movements of a stop finger that are especially relevant to safety or at risk of collision can be monitored in this way. This applies particularly for adjustment movements both along a so-called X-axis, which is to say horizontally along an adjustment axis pointing in the direction of a workpiece feed side or a bending plane, and along a so-called Z-axis, which is to say along an adjustment axis of the workpiece processing machine extending horizontally, parallel to a working surface or a bench beam of a press brake.

It is, however, also possible to provide that the first light beam is directed into the area ahead of the stop finger in the adjustment direction by an optical mirror surface, in particular a flat mirror surface.

As a result of this measure, movement coupling, particularly of the illuminating device or the first light beam with the stop finger, can be achieved simply and efficiently. The illuminating device can, for example, again be arranged on a bracket of the stop device, and the first light beam can be deflected into the area ahead of the stop finger by the mirror surface during a displacement movement of the stop finger. Due to the flat mirror surface, an accurately positioned deflection of the first light beam into the area ahead of the stop finger in the adjustment direction is also possible. In this design, the beam path of the first light beam can also be directed through a protected, or at least largely inaccessible, interior area of the workpiece processing machine so that unintended or unwanted triggering of a safety measure on account of improper interruption of the first light beam can be prevented efficaciously. The dimensions of the optical mirror surface can be chosen to be large enough in this design to be able to ensure radiation of the first light beam into the entire area to be monitored, or at least into a safety-relevant area of the workpiece processing machine, as a function of the arrangement of the illuminating device.

It can be provided in another measure of the method that the first light beam is radiated into the area ahead of the stop finger as an at least largely parallel light beam whose beam path forms a first, planar light surface. The first light beam here is thus radiated as a light beam that at least is only slightly divergent and whose beam path is located in at least the first light surface.

When a suitably designed illuminating device or light source is used, a spatially limited first light beam can be radiated into the area ahead of the stop finger. It is advantageous here that unintended irradiation of an object surface in the area of the machine by the first light beam, and thus an unwanted detection of the first light image by the at least one detection device, can be prevented efficaciously. As a result, an unwanted shutdown of the stop finger or of the entire workpiece processing machine can also be prevented. In this embodiment, the first light beam or its beam path is radiated virtually as a planar light surface, which is to say in a plane. The shape of the first light image on a flat, horizontally oriented object surface is provided in this case by a strip of light or a line of light.

Subsequently, it can be useful if the first light beam is radiated into the area ahead of the stop finger in the adjustment direction such that a light beam transverse axis of the first light surface extending transversely or perpendicularly to the beam path is at least largely parallel to a contact surface of the stop finger.

In this way, the first light beam can be spatially limited, primarily in the direction of the adjustment movement of the stop finger. Nevertheless, an obstruction in the adjustment direction can dependably be detected quickly and reliably by detection of the first light image on a surface of the obstruction.

In this context, it can also be advantageous if the first light beam is radiated into the area ahead of the stop finger in the adjustment direction such that a transverse extent of the first light surface parallel to the light beam transverse axis in the area of the stop finger is bigger than a width of the stop finger extending between two side edges.

Due to this measure, even obstructions to the side relative to the adjustment direction of the stop finger can be detected by means of the at least one detection device. This is advantageous, for example, for detection of an improper or incorrect intervention by a person from a lateral engagement side with respect to the adjustment direction of the stop finger.

In a preferred variant of the method, it can be provided that the first light beam is radiated into the area ahead of the stop finger in the adjustment direction by means of an illuminating device comprising a line laser.

As a result, the first light beam is radiated in by means of a light source that, on the one hand, produces a sufficiently high light intensity of a first light image on a surface of an obstruction. In this way, the accuracy and speed of detection of the first light image by the at least one detection device can be improved. In addition, a tightly limited, parallel, at least predominantly monochromatic light beam can be produced with a light source of this nature.

In an improvement of the method, it can be provided that the first light beam is radiated into the area ahead of the stop finger in the displacement or adjustment direction at least at a minimum distance from a limiting edge of the stop finger that leads in the adjustment direction.

The minimum distance can be determined at least by a maximum stopping distance for the stop finger due to control-related and drive-related factors plus a maximum possible position error of the stop finger or of the limiting edge of the stop finger.

When the method is conducted in such a manner, it is possible to further minimize the risk of collisions of the stop finger with obstructions in the adjustment direction. In particular, it is possible in this way to account for drive-related, computing-time-related, control-related, and measurement-related delays or errors for stopping the stop finger in the event of detection of the first light image. In this case, the stopping distance can contain or take into account a drive-related braking distance as well as a reaction distance. The reaction distance, in turn, can be determined by the measurement time or measurement cycle time, which is to say the maximum possible time elapsing from the appearance of the first light image on the surface of an obstruction to the detection of the first light image, and by the delays caused by bus cycles and calculation cycles of a control unit.

In principle, it can be useful if an illuminating device directly arranged on or attached to the stop finger is adjusted in a motion-coupled manner with the stop finger upon every adjustment movement of the stop finger. In such cases, the illuminating device can, for example, have multiple light sources that each radiate a light beam into the respective area ahead of the stop finger. As a result, every adjustment movement or every adjustment direction of a stop finger can be monitored for obstructions.

However, it can also be advantageous if the illuminating device is not adjusted in the direction of a vertical adjustment axis that is perpendicular to a base surface.

Such vertically executed displacement movements or height adjustments of a stop finger occur, for example, when a specific contact surface and/or support surface of the stop finger is to be brought to the same height as a working surface. Especially in the case of bending machines or press brakes, this vertical adjustment axis is called the R adjustment axis. Usually, vertical adjustment movements along the R adjustment axis only take place over very short distances. In addition, vertical adjustments of a stop finger are usually carried out in an area of a machine that is not especially relevant in terms of safety, for which reason it is advantageously possible to forego monitoring in such cases.

In a preferred improvement, it can be provided that a second light image is projected by the illuminating device that is motion-coupled to the stop finger onto a surface of the stop finger that is detectable by means of the at least one optical detection device, wherein the second light image is continuously projected onto the surface of the stop finger at least during adjustment movements of the illuminating device that are motion-coupled to the stop finger.

This measure yields the advantage that a second light image on the surface of the stop finger can be generated in this way, which light image is continuously detectable, at least in the monitoring area(s), by the at least one detection device. In this way, a safety-relevant measure for functional verification of the illuminating device and/or of the at least one optical detection device is provided. The second light image can be created by a second light beam radiated onto the surface of the stop finger. To this end, the illuminating device can, in principle, have another light source in addition to the light source that generates the first light beam. However, one light source can also be provided for creation of both the first and the second light beams and for projection of the second light image. In principle, the second light image can be projected onto any surface of the stop finger, which surface is located within the monitoring area(s) of the at least one optical detection device within the scope of the adjustment movements of the stop finger, and thus is continuously detectable by the optical detection device(s). For example, it can be provided that the second light image is projected onto a front area of the surface of the stop finger facing in the direction of the workpiece feed side of the workpiece processing machine. If the stop finger in question has, for example, support surfaces for placement of a workpiece to be processed, however, it can also be provided that the second light image is projected onto a surface of the stop finger located at the very top.

Subsequently, for the case that the second light image is not detected during operation of the workpiece processing machine, a safety measure is immediately initiated. For example, a measure can comprise, at the least, triggering of an alarm by the control device. Subsequently it is also possible that the workpiece processing machine, or at least the relevant stop finger on which no second light image is detected, is immediately stopped or shut down, or at least placed in a safe state. Servicing measures or repair measures to correct a malfunction can then be initiated or performed.

Subsequently, it can also be provided that a safety measure is again initiated in the event of nondetection of the second light image, for example the operation of the workpiece processing machine is stopped. Then a functional verification of the relevant illuminating device and the relevant optical detection device can be carried out, for example, and servicing measures or repair measures can be initiated or performed in the event of malfunctions.

It can also be provided that the second light image is projected onto the surface of the stop finger in the form of a second strip of light that is or extends parallel to a contact surface of the stop finger.

In addition, it can be useful that a third strip of light that is or extends parallel to the second strip of light is projected onto the surface of the stop finger at a distance from the second strip of light by the illuminating device that is motion-coupled to the stop finger, wherein the third strip of light is again continuously projected onto the surface of the stop finger at least during adjustment movements of the illuminating device that are motion-coupled to the stop finger. The second and the third strips of light in this case are detectable on a flat surface of the stop finger as straight strips of light or lines of light that are parallel to one another, regardless of the angle of view or the viewing position of the detection device.

In this context, it can be advantageous that the monitoring area is monitored by means of at least one stationary imaging camera, in particular by means of at least one CCD camera.

By provision of an imaging camera, the position of a second light image or second strip of light and/or of a third strip of light continuously projected onto the surface of a stop finger in the field of view or in the monitoring area of the imaging camera in question can always be determined, since the mounting coordinates and alignment coordinates of such a stationary imaging camera are known. In this way, the position of the stop finger can also be determined in the case of adjustment movements of the illuminating device that are motion-coupled to the stop finger. The second and/or third strips of light serve here as easily detectable reference lines or strips for the imaging camera.

In particular, it can be provided that a position of the stop finger is determined computationally from the location of the second and/or third strips of light in the monitoring area detected visually or through imaging with the camera.

As a result, the position of the second and/or third strips of light can be determined, for example along the so-called Z-axis, which is to say along a horizontal adjustment axis for the stop finger that is parallel to a working surface or a bench beam of a press brake. In the case of an arrangement of the illuminating device that is motion-coupled to the stop finger along the Z-axis, the position of the stop finger along the Z-axis can thus also be determined. The same also applies, of course, to all adjustment axes along which the stop finger can be adjusted, provided that the illuminating device is adjusted with the stop finger in a motion-coupled manner along the adjustment axis involved.

It can also be advantageous, however, that a distance between a limiting edge of the stop finger on the workpiece feed side and the camera is determined computationally from a visually detected, apparent perpendicular distance between the second strip of light and the third strip of light.

This is especially useful in order to monitor or to visually track adjustment movements of the stop finger in the so-called X-direction, which is to say horizontally along an adjustment axis pointing in the direction of a workpiece feed side or a bending plane. Lastly, based on the knowledge of the actual perpendicular distance between the second and third strips of light, as well as knowledge of the position and orientation of the at least one stationary camera, it is also possible to computationally determine a distance from reference points, as for example a distance from the coordinates of a stop position that is to be approached, from the apparent perpendicular distance between the two strips of light that is visually detected from the angle of view of the stationary camera.

In another variant of the method, it can be provided that the first light beam is immediately activated in the event of an automatically controlled start of an adjustment movement of the stop finger into a stop position.

It can be ensured by this means that the monitoring of the corresponding adjustment movement is activated immediately, and operational safety is ensured.

However, it can also be provided that the first light beam is immediately deactivated upon reaching a stop position that is specified for control-related reasons.

In this way, unwanted triggering of safety measures can be prevented efficaciously. For example, it is possible to prevent the first light image from being detected and a safety measure from being triggered in the event that an operator's hand enters the beam path of the first light beam, for example in order to manually position a workpiece on a support surface of the stop finger. The specified measure does not represent a safety hazard in this case, since there is no risk of collision due to an adjustment movement as long as the stop finger is in the stop position.

Moreover, it can be useful if, during an adjustment movement into a stop position, the first light beam is deactivated during the adjustment movement, at a distance from the respective stop position that can be specified for control-related reasons, until the respective stop position is reached.

As a result, unwanted triggering of safety measures can be prevented, for example when it is known on the basis of the specified coordinates of a stop position that an object or an object surface will of necessity be located in the beam path of the first light beam when the stop finger approaches the stop position. Such an object can be, for example, another machine component of the workpiece processing machine.

In addition, it can be advantageous if the first light beam is always deactivated when the stop finger is at a standstill.

In a preferred improvement of the method, it can be provided that an immediate retraction movement of the stop finger is triggered as an automatically controlled safety measure.

Operational safety, in particular the safety of persons, can be improved still further by this measure of the method, because a stop finger can be removed promptly from a potentially hazardous area. The retraction movement in this case can be performed by means of a respective drive of the corresponding adjustment axis. Alternatively and/or in addition, however, separate drive means can also be provided for execution of a retraction movement for a stop finger, which separate drive means preferably are designed primarily for quick release.

In addition, it can be useful that an automatically controlled safety measure is never triggered when the stop finger is at a standstill.

By this means as well, an unplanned or unwanted interruption of the operation of the workpiece processing machine can be prevented efficaciously.

Lastly, it can be advantageous if the first light beam is radiated into the area ahead of the stop finger during an adjustment movement of the stop finger into a stop position performed along a horizontal adjustment axis in the direction of a workpiece feed side.

A simple-to-perform but nonetheless efficient method for monitoring an adjustment movement of a stop finger directly into a stop position can be provided by this means.

The task of the invention is also accomplished, however, in that a workpiece processing machine, in particular a bending machine, is provided according to the features of the claims.

The workpiece processing machine has an automatically controlled stop device, comprising at least one automatically controlled stop finger that is displaceable along at least one driven adjustment axis and that has at least one contact surface intended for placement of the tool to be formed.

The workpiece processing machine has a control device for automatic control of adjustment or displacement movements of the stop finger along the at least one adjustment axis.

It is essential that the workpiece processing machine has a monitoring device that is connected by signaling means to the control device and comprises an illuminating device and at least one optical detection device. It is provided here that the illuminating device is arranged to be motion-coupled to the stop finger, and is designed for radiation of a first light beam into an area ahead of the stop finger in the adjustment direction during an automatically controlled adjustment movement of the at least one stop finger in operation of the workpiece processing machine. In addition, it is provided that the at least one detection device is designed for detection of a first light image created when the first light beam is incident on an object surface, and is arranged to be stationary for monitoring of a monitoring area.

The control device is designed for immediate triggering of at least one safety measure in the event the first light beam is activated and detection of the first light image by the at least one optical detection device takes place during the adjustment movement of the stop finger.

By means of these technical features, a workpiece processing machine that is improved in terms of safety can be made available. Specifically, obstructions in the adjustment area of the stop finger, in particular in the adjustment direction of the stop finger that is especially safety-relevant, can be detected quickly and with reliable recognition. There is an especially high potential for collision with obstructions in the adjustment direction of the stop finger. Depending on the monitoring area of the at least one detection device, and/or the number and arrangement or orientation of detection devices, for example, a specific, safety-relevant area of the workpiece processing machine, or else a full possible displacement or adjustment area of the stop finger, can be monitored for obstructions. As a result of the features specified, the workpiece processing machine can be operated highly productively with short cycle times, since it is possible to forego measures such as a reduction of the adjustment speed of a stop finger in especially safety-relevant areas. In particular, with a workpiece processing machine having the proposed features, a collision of the stop finger during an automatically controlled adjustment movement can not only be lessened, but can in principle be prevented entirely.

The specified features are especially suitable for use in bending machines, particularly for use in brake press machines or press brakes, since automatically controlled stop fingers are commonly used with such machines.

The illuminating device can, for example, comprise a light source that is designed for emission of a light cone, light cylinder, or other light beam structure. Basically, any suitable optical elements can be used in combination with the illuminating device to produce the light beam as long as it is ensured that the light beam can be radiated into an area ahead of the stop finger during an adjustment movement without a first light image being created on a surface of the machine or a machine component.

It is advantageous in this regard when the at least one detection device is matched to the light emitted by the illuminating device in terms of detection or recognition. For example, the light emitted by the illuminating device can be monochromatic. In this context, the at least one optical detection device can be designed, for example, specifically for reliable recognition or detection of the light or light beam emitted by the illumination device, in particular for the most reliable detection possible of light with the wavelength radiated by the illumination device.

Of course, it is also possible that multiple optical detection devices are arranged on the workpiece processing machine. The individual detection devices can each detect or cover different monitoring areas in this case, which monitoring areas may overlap.

Multiple monitoring areas of individual optical detection devices can be computationally combined into one extended monitoring area in this case. As a result, a workpiece processing machine with the most continuous possible monitoring of the adjustment movements of the stop finger in the area of the entire workpiece processing machine can be provided, even when design elements of the machine are present that hinder detection, such as struts and the like. If need be, it is possible to forego monitoring for areas of the workpiece processing machine that pose no risks in regard to safety.

Both the illuminating device and the optical detection device(s) can be arranged on the workpiece processing machine such that they can each be calibrated for the purpose of any possible calibration of the beam path or of a monitoring area. Such a calibration may be necessary, for example, in the event of a conversion or perhaps a re-equipping of the machine with different machine components or processing tools.

In an improvement of the workpiece processing machine, it can be provided that the illuminating device is arranged to be adjustable in a motion-coupled manner with the stop device along at least two driven displacement or adjustment axes.

For this purpose, the illuminating device can, for example, be arranged or mounted on a bracket or surface of the stop device, which bracket is adjusted along the two axes in operation of the workpiece processing machine. With suitable calibration or alignment of the illuminating device, it can be achieved in a simple manner by this means that the first light beam is radiated into the area ahead of the stop finger during an adjustment movement of the stop finger along the two adjustment axes in operation. In the case of a bending machine, in particular a press brake, the movement coupling of the illuminating device along two adjustment axes is especially useful, because automated adjustment movements of a stop finger that are especially relevant to safety or at risk of collision can be monitored in this way. This applies particularly for adjustment movements both along a so-called X-axis, which is to say horizontally along an adjustment axis pointing in the direction of a workpiece feed side or a bending plane, and along a so-called Z-axis, which is to say along an adjustment axis of the workpiece processing machine extending horizontally, parallel to a working surface or a bench beam of a press brake.

In principle, it can also be provided that an illuminating device is directly arranged on or attached to a stop finger so that the illuminating device is adjusted along with the stop finger in a motion-coupled manner upon every adjustment movement of the stop finger. In such cases, the illuminating device can, for example, have multiple light sources that each radiate a light beam into the respective area ahead of the stop finger. As a result, every adjustment movement or every adjustment direction of a stop finger can be monitored for obstructions.

It can also be useful, however, that an optical mirror surface, in particular a flat mirror surface, is arranged for orientation of the first light beam into the area ahead of the stop finger.

By this means, the illuminating device can, for example, be arranged in a simple manner on a surface on the stop device. In operation of the workpiece processing machine, the first light beam can be deflected into the area ahead of the stop finger by the mirror surface. The dimensions of the optical mirror surface can be chosen to be large enough in this design to be able to ensure radiation of the first light beam into the entire area to be monitored, or at least into a safety-relevant area of the workpiece processing machine, as a function of the arrangement of the illuminating device.

In a preferred variant embodiment of the workpiece processing machine, it can be provided that the illuminating device comprises a line laser that is designed for emission, into the area ahead of the stop finger, of an at least largely parallel first light beam whose beam path is located in a first, planar light surface.

By this means, an at least predominantly monochromatic light source with high light intensity for creation of the first light beam can be provided so that the accuracy of detection of a first light image can be improved in operation of the workpiece processing machine. The first light beam in this embodiment can be emitted as a planar light surface, which is to say in a plane, by which means a spatially limited first light beam can be radiated into the area ahead of the stop finger.

Moreover, it can be useful that the line laser is arranged such that a light beam transverse axis of the first light surface that is perpendicular to the beam path or to the direction of radiation of the first light beam is at least largely parallel to a contact surface of the stop finger in operation of the workpiece processing machine.

In operation of the workpiece processing machine, the first light beam can be spatially limited by this means, primarily in the direction of the adjustment movement of the stop finger. Nevertheless, an obstruction in the adjustment direction can dependably be detected quickly and reliably by detection of the first light image on a surface of the obstruction or an object surface.

It can also be provided here that the line laser is arranged such that a transverse extent of the first light surface parallel to the light beam transverse axis in the area of the stop finger is bigger than a width of the stop finger extending between two side edges in operation of the workpiece processing machine.

By means of a line laser arranged or oriented in this way, even obstructions to the side relative to the adjustment direction of the stop finger can be detected by means of the at least one detection device in operation of the workpiece processing machine. Moreover, it is even possible to detect obstructions or objects that appear in the adjustment direction in the case of an adjustment movement of the stop finger along an adjustment axis parallel to the light beam transverse axis. In these adjustment directions, therefore, it is possible with a first light beam implemented in this way to forego radiation of additional light beams into the area ahead in the respective adjustment direction because a first light beam of this type is also radiated into the area ahead of the stop finger in these adjustment directions.

In a preferred variant embodiment of the workpiece processing machine, it can be provided that the line laser is designed for projection onto the surface of the stop finger of a second strip of light parallel to a contact surface of the stop finger.

As a result, in operation of the machine with a motion-coupled line laser, a strip of light can be produced on the surface of the stop finger that is continuously detectable during an adjustment movement. This variant embodiment is advantageous especially because it is possible to provide a safety-relevant measure for functional verification of the illuminating device and/or the at least one optical detection device.

Subsequently, it can also be provided that the line laser is designed for projection onto the surface of the stop finger of a third strip of light that is or extends parallel to the second strip of light at a distance from the second strip of light.

For production of the multiple light beams or strips of light, the line laser can comprise diffractive optical elements and so-called Powell lenses, for example.

Moreover, an embodiment of the workpiece processing machine can also be advantageous in which the at least one optical detection device comprises a stationary imaging camera, in particular a CCD camera.

In operation of the workpiece processing machine, the position of a second strip of light and/or of a third strip of light continuously projected onto the surface of a stop finger in the field of view or in the monitoring area of the imaging camera in question can always be determined by means of a stationary imaging camera, since the mounting coordinates and alignment coordinates of such a stationary imaging camera are known. In this way, the position of the stop finger can also be determined in the case of adjustment movements of the illuminating device that are motion-coupled to the stop finger, wherein the laser lines or the second and/or the third strips of light on the surface of the stop finger can be used as reference strips.

In the case of a bending machine, in particular a press brake, in operation it is possible to determine, for example, the position of the second and/or third strip of light along the so-called Z-axis, which is to say along an adjustment axis for the stop finger extending horizontally, parallel to a working surface or a bench beam of a press brake. In the case of an arrangement of the illuminating device that is motion-coupled to the stop finger along the Z-axis, the position of the stop finger along the Z-axis can also be determined in this way.

The continuously visible reference strips each projected at an apparent perpendicular distance from one another or the second and the third laser line or light line can also be used, however, for visual tracking of adjustment movements of the stop finger in the so-called X-direction, which is to say horizontally along an adjustment axis pointing in the direction of a workpiece feed side or a bending plane. For example, it can be provided in operation of a brake press that a distance of a limiting edge on the workpiece feed side from the camera and/or an arbitrary reference position in the machine coordinate system is determined computationally from a visually detected, apparent perpendicular distance between the second strip of light and the third strip of light.

In addition, a variant embodiment of the workpiece processing machine can be advantageous in which the mirror surface extends over the entire length of a bench beam implemented on the workpiece processing machine.

In this way, a workpiece processing machine can be provided in which adjustment movements of a stop finger can be monitored or tracked over the entire working surface of the machine.

An embodiment can also be useful in which the illuminating device is not motion-coupled to the stop finger along a vertical adjustment axis that is perpendicular to a base surface.

Such vertical adjustment movements of a stop finger usually take place only over very short distances, for example along the so-called R-axis in the case of press brakes. In addition, vertical adjustments of a stop finger are usually carried out in an area of a machine that is not especially relevant in terms of safety, for which reason it is advantageously possible in such cases to forego monitoring.

Lastly, it can be useful if at least one horizontal, driven adjustment axis is provided for automatically controlled adjustment of the at least one stop finger in the direction of a workpiece feed side into a stop position.

As a result, a simply designed linear adjustment axis for transfer of a stop finger into the stop position is provided, which displacement or adjustment axis can be monitored especially simply but nonetheless efficiently with regard to obstructions.

For better understanding, the invention is explained below in detail on the basis of the figures.

The figures show, in highly simplified, schematic representation:

FIG. 1 an exemplary embodiment for a workpiece processing machine with stop fingers, in a perspective view;

FIG. 2 a side view of a press brake with a representation of the method during operation of the press brake;

FIG. 3 detail of a monitoring area for adjustment movements of a stop finger in a plan view from above;

FIG. 4 detail of a monitoring area for adjustment movements of a stop finger, with light images on a surface of the stop finger, in a plan view from above.

As an introduction, it should be stated that the same parts are labeled with the same reference symbols or the same component designations in the different embodiments described, wherein the disclosures contained in the description as a whole can be applied analogously to the same parts having the same reference symbols or the same component designations. Also, the position information chosen in the description, such as top, bottom, lateral, etc., for example, refers to the figure being directly described and shown, and this position information must be transferred analogously to the new position in the event of a change in position.

In the following, a workpiece processing machine, and a method for operating a workpiece processing machine, are described in detail on the basis of a bending machine or press brake as an exemplary embodiment. It should be noted here that the following information can of course also be applied to other types of workpiece processing machines in which automatically controlled stop devices with stop fingers are used for position control of workpieces, and that a person skilled in the technical field can also apply the teaching presented hereinbelow to other types of workpiece processing machines.

In FIG. 1, a bending machine 2, in particular a press brake 3, is shown as an example for a workpiece processing machine 1. The workpiece processing machine 1 or press brake 3 is intended for processing, in particular bending, of a workpiece 4. The press brake 3 has a stationary bench beam 6 that is perpendicular to a base surface 5. For processing of workpieces 4, the bending machine 2, or the press brake 3 shown, has a press beam 7, which is adjustable or displaceable in the vertical direction relative to the bench beam 6 by drive means 8, for example hydraulic cylinders 9.

The processing or forming of a workpiece 4 in the press brake 3 according to the exemplary embodiment shown in FIG. 1 is accomplished by means of a bottom bending tool 10 and a top bending tool 11. In this regard, a bottom bending tool 10, for instance a so-called bending die, can be arranged in a bottom tool holder 12 at a face 13 of the bench beam 6. A top bending tool 11 or a so-called bending punch can be arranged in a top tool holder 14 at a face 15 of the press beam 7.

Normally, the bending tools 10, 11 are exchangeably arranged or held in the tool holders so that suitable bending tools 10, 11 can be chosen or used each time for a respective processing or forming of a workpiece 4. Of course, it is also possible that multiple bottom bending tools 10 and top bending tools 11 at a time are arranged in the tool holders in operation of the press brake 3, for example in order to be able to carry out different bending processes on a workpiece 4 in successive forming or bending operations. For reasons of clarity, only one bottom bending tool 10 and one top bending tool 11 are shown in the exemplary embodiment according to FIG. 1.

In addition, at least one automatically controlled stop device 16, with at least one stop finger 17, is shown in the press brake 3 shown in FIG. 1 as an exemplary embodiment. In the exemplary embodiment shown, two stop devices 16 with one stop finger 17 apiece are shown by way of example, wherein it is self-evident that a workpiece processing machine 1 can also have just one stop finger 17 or one stop device 16, or alternatively more than two stop fingers 17 or more than two stop devices 16.

The two stop devices 16 or stop fingers 17 shown in FIG. 1 are located in a press space 18 on a back side of the bench beam 6 of the bending machine 2 or press brake 3 shown by way of example. The stop finger or fingers 17 can each be adjusted or displaced into a stop position 19 provided for positioning of a workpiece 4. When a stop finger 17 is adjusted into a stop position 19, a workpiece 4 to be processed can then be placed against a contact surface 21 of a stop finger 17 from a front side facing away from the press space, or a workpiece feed side 20, of the workpiece processing machine 1, and consequently be positioned in the most exactly defined way possible between the two bending tools 10, 11 for processing or for forming by bending. The stop fingers 17 shown by way of example in FIG. 1 have only one contact surface 21. Generally speaking, variant embodiments of stop fingers 17 can also comprise more than one contact surface 21, and also support surfaces for workpieces 4.

The stop devices 16 or the stop fingers 17 shown in FIG. 1 are usually adjusted or displaced under automatic control along respectively driven adjustment axes 22 by means of drive arrangements (not shown in FIG. 1), comprising, for example, guideways and actuators such as electric motors, in particular servomotors. In this regard, the at least one stop finger 17 is adjusted along at least one driven displacement or adjustment axis 22 into a stop position 19 intended for positioning or placement of a workpiece 4, as is illustrated using the stop finger 17 shown on the left in FIG. 1.

A control device 23 can be provided for control of the adjustment or displacement movements of a stop device 16 or stop finger 17 along the at least one adjustment axis 22. As is indicated in FIG. 1, the control device 23 can have multiple components, for example multiple processors or computer components, input means for entry of control commands, output means for display of information, etc. In addition, it is also possible that the control device 23 is connected to additional control components, for example to mobile input and output means through a network, or through the Internet. Basically, the type and design, or the electronic and data architecture, of the control device 23 can be implemented in any desired way by an expert in the field. The control device 23 can preferably be composed of a CNC controller that supplies or applies power and control signals to the workpiece processing machine 1 or the press brake 3 shown by way of example and the components thereof, in particular drive elements of the stop devices 16.

An adjustment or automated displacement of stop fingers along at least one displacement or adjustment axis 22 or CNC axis can fundamentally be provided in bending machines 2 or press brakes 3. Usually, a stop finger is designed to be movable along at least two horizontal CNC axes, namely along a so-called X-axis direction and a so-called Z-axis direction. In many cases, an adjustment of a stop finger 17 along a vertical axis, namely along a so-called R-axis direction, can also be provided. The orientation of these adjustment axes 22, which are customary in a press brake 3, is illustrated in the perspective view in FIG. 1 using the added X-axis direction 24, Z-axis direction 25, and R-axis direction 26, or coordinate axes. In this regard, at least one horizontal, driven adjustment axis 22 is provided for automatically controlled adjustment of the at least one stop finger 17 in the direction of a workpiece feed side 20 into a stop position 19.

In FIG. 2, an exemplary embodiment of a press brake 3 is shown in side view. The same reference symbols or component designations are used for the same parts as in the preceding FIG. 1. In order to avoid unnecessary repetition, the detailed description in the preceding FIG. 1 is referred to or referenced.

A stop device 16 with a stop finger 17 is shown in FIG. 2. In this exemplary embodiment, the stop finger 17 has two contact surfaces 21 and one support surface 27 for a respective workpiece 4. The stop device 16 or the stop finger 17 can be adjusted along the adjustment axis 22 in the X-axis direction 24, Z-axis direction 25, and R-axis direction 26 by means of drive arrangements 29.

The stop finger 17 shown, or the stop device 16, can be adjusted, on the one hand, along the horizontal adjustment axis 22 oriented in the X-axis direction 24 perpendicular to a bending plane 28 or working plane of the bending tools 10, 11 of the press brake 3. To this end, the stop device 16 can be movably supported on a guideway 30. An electric motor, in particular a servomotor 31, that can be controlled by the control device 23, see FIG. 1, can be provided as an actuator for the adjustment of the stop device 16 and the stop finger 17, for example. The rotary movements of the servomotor 31 can be transmitted to a gear rack arrangement or other motion transmission device of the stop device 16, for example by means of a pinion 32 or another transmission device, by which means the stop device 16 and the stop finger 17 can be positioned along the adjustment axis 22 oriented in the X-axis direction 24.

For adjustment of the stop device 16 or the stop finger 17 along the adjustment axis 22 oriented in the Z-axis direction 25, an analogous drive arrangement 29, comprising an additional guideway 30, an additional servomotor 31, an additional pinion 32, and an additional gear rack arrangement or other corresponding motion transmission devices can in principle be provided, as is illustrated in the exemplary embodiment according to FIG. 2. In the side view of the press brake 3 according to FIG. 2, an adjustment movement of the stop device 16 and the stop finger 17 along the adjustment axis 22 oriented in the Z-axis direction 25 corresponds to a horizontal adjustment movement perpendicular to the plane of the technical drawing according to FIG. 2.

Moreover, an additional corresponding drive arrangement 29, with guideways 30, servomotor 31, and motion transmission devices can also be provided for adjustment of a stop finger 17 and/or a stop device 16 along a vertical adjustment axis 22 that is parallel to the bending plane in the R-axis direction 26. In the exemplary embodiment of a press brake 3 according to FIG. 2, an additional guideway 33 is provided on a bracket 34 of the stop device 16 so that the stop finger 17 shown can be adjusted on the bracket 34, respectively relative to the bracket 34 in the R-axis direction 26. In this case, the bracket 34 of the stop device 16 is adjusted along the adjustment axes 22 oriented in the X-axis direction 24 and in the Z-axis direction 25, but not along the adjustment axis 22 oriented in the R-axis direction. Thus, in the exemplary embodiment shown, only the stop finger 17 is adjusted in the R-axis direction 26, and not the entire stop device 16, in particular not the bracket 34.

In the case of automatically controlled adjustment or displacement movements of the stop device 16 or of the stop finger 17, a risk of collision of the stop finger 17 with other objects, for example an operator's hand, always exists. Therefore, monitoring device 35 that is connected by signaling means to the control device 23 and that comprises an illuminating device 36 and at least one optical detection device 37 is provided as an essential component of the workpiece processing machine 1.

The illuminating device 36 here is arranged or mounted to be motion-coupled with the stop finger 17 or the stop device 16, and is designed or arranged and oriented for emission of a first light beam 38 into an area ahead of the stop finger 17 in the adjustment direction 39 during an automatically controlled adjustment movement of the at least one stop finger 17 in operation of the workpiece processing machine 1. Consequently, a first light beam 38 can be radiated into an area ahead of the stop finger 17 in the adjustment direction 39, by means of the illuminating device 36 motion-coupled to the stop finger 17 along the at least one adjustment axis 22, during an automatically controlled adjustment movement of the stop finger 17 or of the stop device 16 along the at least one adjustment axis 22. The first light beam 38 is illustrated with dashed lines in each case in FIG. 2 and the following figures. This should not be interpreted as though the beam path of the first light beam 38 were somehow interrupted. Rather, the illuminating device 36 can be designed for emission of a continuous first light beam 38. Of course, emission of a pulsed first light beam 38 is also possible in principle.

In the exemplary embodiment according to FIG. 2, a horizontal adjustment movement of the stop finger 17 along the X-axis direction 24 perpendicular to the bending plane 28 in the direction of the workpiece feed side 20 is illustrated using the arrow 39 as an example for an adjustment direction. This illustrated adjustment direction 39 of a stop finger 17 involves an especially great hazard potential for collisions because operators often work in the area on the workpiece feed side of the press brake 3 shown, for example handling the workpieces 4 to be processed. For this reason, it is especially important that the first light beam 38 is radiated into an area ahead of the stop finger 17 during an adjustment movement of the stop finger 17 performed along a horizontal adjustment axis 22 toward a workpiece feed side 20 into a stop position 19. The adjustment direction 39 shown in FIG. 2 corresponds to an adjustment of the stop finger 17 along an adjustment axis 22 in the X-axis direction 24.

As is shown in the exemplary embodiment according to FIG. 2, the illuminating device 36 can be arranged on the bracket 34 of the stop device 16, for example, so that the illuminating device 36 can be adjusted together with the stop finger 17 and the stop device 16 in the event of adjustment movements along the adjustment axes 22 oriented in the X-axis direction 24 and in the Z-axis direction 25, which is to say that the illuminating device 36 is motion-coupled to the stop finger 17.

Fundamentally, it can be provided that the illuminating device 36 is adjusted or displaced along more than one adjustment axis 22, for example at least along two adjustment axes 22 in a motion-coupled manner with a stop finger 17 as already shown.

In the exemplary embodiment of a press brake 3 according to FIG. 2, the illuminating device 36 is arranged to be adjustable in a motion-coupled manner with the stop finger 17 at least along two driven adjustment axes 22, namely in the X-axis direction 24 and in the Z-axis direction 25. The illuminating device 36 is arranged on the bracket 34 of the stop device 16, which bracket 34 is adjustable along each of the adjustment axes 22 extending in the X-axis direction 24 and in the Z-axis direction 25 together with the stop finger 17, which is to say for adjustment of the stop finger 17.

Basically, it is also possible that an illuminating device 36 is directly arranged on or attached to a stop finger 17. In this case, the illuminating device 36 would of course be adjusted along with the stop finger 17 in a motion-coupled manner upon every adjustment movement of the stop finger 17. In such cases, the illuminating device 36 can, for example, have multiple light sources that each radiate a light beam into the respective area ahead of the stop finger 17.

It can also be provided, however, that the illuminating device 36 is not arranged to be motion-coupled to the stop finger 17 along a vertical adjustment axis 22 that is perpendicular to a base surface 5, or in other words is not adjusted in a motion-coupled way with the stop finger 17 in a vertical direction, as is also illustrated using the exemplary embodiment of a workpiece processing machine 1 shown in FIG. 2. In the case of the press brake 3 shown, the stop finger 17 is adjusted along the adjustment axis 22 extending in the R-axis direction 26, independently of the bracket 34 or relative to the bracket 34. Vertical adjustment movements along the adjustment axis 22 extending in the vertical R-axis direction 26 usually take place only over very short distances, which is why it is possible, in principle, to forgo monitoring of these vertical adjustment movements of the stop finger 17.

For radiation of the first light beam 38 into the area ahead of the stop finger 17 in adjustment direction 39, an arrangement can be useful in which an optical mirror surface 40 is positioned for orientation of the first light beam, as is also shown in FIG. 2. In particular, a flat mirror surface can be implemented, by means of which the first light beam 38 is directed into the area ahead of the stop finger 17 in adjustment direction 39. The measurements of the mirror surface 40 must be chosen to be large enough in this design to be able to radiate the first light beam via the mirror surface 40 into an area ahead of the respective stop finger 17 over as much of a full possible adjustment movement area of the stop finger 17 as possible. It can be provided here that the mirror surface 40 extends over the entire length of a bench beam 6 implemented on the workpiece processing machine 1, see FIG. 1. In the exemplary embodiment shown in FIG. 2, the first light beam 38 can fundamentally be radiated into a respective area ahead of the stop finger 17 both in the case of adjustment movements of the stop finger 17 along the X-axis direction 24 toward the workpiece feed side 20 and in the case of adjustment movements along the respective Z-axis directions 25, as is explained below on the basis of FIG. 3.

As is evident from FIG. 2, the at least one detection device 37 is arranged to be stationary for monitoring of a monitoring area 41, and a monitoring area 41 for adjustment movements of the stop finger 17 is monitored by means of the at least one optical detection device 37 in operation of the workpiece processing machine. In this regard, the at least one detection device 37 is designed for detection of a first light image 43 created when the first light beam 38 is incident on an object surface 42, see FIG. 3. The at least one optical detection device 37 can be arranged to be calibratable for setting of the monitoring area 41 as a matter of principle.

In FIG. 3, the same reference symbols or component designations are again used for the same parts as in the preceding FIGS. 1 and 2. In order to avoid unnecessary repetition, the detailed description in the preceding FIGS. 1 and 2 is referred to or referenced. FIG. 3 shows a detail of a monitoring area 41 monitored by the at least one detection device 37, in a plan view from above. For better clarity, the first light beam 38 is only shown in the image plane of the first light image 43 in FIG. 3. The first light beam 38 can, for example, be radiated into the area ahead of the stop finger 17 at an angle, as can be seen most clearly in FIG. 2.

A monitoring area 41, in which adjustment movements of a stop finger 17 take place, is monitored by the at least one detection device 37, see FIG. 2. In this case, multiple optical detection devices 37 can of course also be used to form a monitoring area 41, wherein individual monitoring areas 44 associated with a respective optical detection device 37 overlap and can add up to a full monitoring area 41 for monitoring of adjustment movements of the stop finger(s) 17, as is illustrated in FIG. 3.

By means of multiple overlapping monitoring areas 44, it is possible to avoid, for example, machine-design-related measurement gaps due to design obstructions, such as struts and the like. In such cases, the overlapping monitoring areas 44 of the different detection devices 37 can each be computationally combined with one another. For example, a stop finger can be virtually handed off in monitoring terms to another detection device 37 upon crossing from one monitoring area 44 into an adjacent monitoring area 44. Of primary importance here is that all safety-relevant areas of the workpiece processing machine can be detected through the full monitoring area 41.

In FIG. 3, adjustment movements of a stop finger 17 are illustrated in two horizontal adjustment directions 39, 45 that are perpendicular to one another. The adjustment movement of the stop finger 17 in the adjustment direction 39 can take place along the X-axis direction 24, for example, see FIGS. 1 and 2. The adjustment movement of the stop finger 17 in the adjustment direction 45 can take place along the Z-axis direction 25, for example, see FIGS. 1 and 2.

By means of the first light beam 38 ahead of the stop finger 17 in each adjustment direction 39, 45, a first light image 43 is projected in each case onto an object surface 42, for example the finger of a person shown in FIG. 3, appearing in the beam path of the first light beam 38 during the adjustment movement of the stop finger 17. This first light image 43 can be detected by means of the at least one optical detection device 37, see FIG. 2. The optical detection device can in principle be composed of any detection device that is designed or suitable for detection of the first light image 43. Preferably, the monitoring area 41 is monitored by means of at least one stationary imaging camera 46. In particular, the at least one optical detection device 37 can comprise a stationary imaging camera 46, in particular a CCD camera. An imaging detection device 37 or camera 46 permits, in particular, a position determination of light images in the monitoring area 41. The first light image 43 shown in FIG. 3 is merely an exemplary illustration. The shape of a respective first light image 43 that is recognizable or detectable for an imaging detection device 37 depends on several factors, of course, in particular on the shape of the object in the beam path of the first light beam 38 and the respective detection angle or position of the detection device 37.

It is essential that, in the event of detection of a first light image 43 projected by the first light beam 38 onto an object surface 42, see FIG. 3, an automatically controlled safety measure is triggered promptly or immediately. For this purpose, the control device 23 that is connected by signaling means to the monitoring device 35 or to the optical detection device 37, see FIG. 2, is designed for immediate triggering of at least one safety measure in the event of an activated first light beam 38 and detection of the first light image 43, see FIG. 3, by the at least one optical detection device 37 during the adjustment movement of the stop finger 17.

In principle, it can be provided, for example, that the control device promptly triggers an audible and/or visible alarm in the event of detection of the first light image 43. As already described, the control device 23 is connected by signaling means to the illuminating device 36 and the at least one detection device 37 of the monitoring device 35 as well as to the drive arrangements 29 for adjustment of a stop finger 17, for instance the servomotors 31 thereof, see FIG. 2. It can be provided that prompt stopping of an adjustment movement of a stop finger 17 is triggered by the control device 23 in the case of detection of the first light image 43. In particular, it can also be provided that an immediate retraction movement 47 of the stop finger 17 is triggered as an automatically controlled safety measure, as is illustrated in FIG. 3 by arrow 47.

In principle, it can also be provided that no automatically controlled safety measure is triggered when the stop finger 17 is at a standstill, because there is no elevated risk potential here with regard to a collision caused by an adjustment movement of a stop finger 17. This is fundamentally independent of whether the illuminating device 36 is activated or deactivated for radiation of the first light beam 38.

In addition, however, it can also be provided that the control device 23 deactivates the first light beam 38 when the stop finger 17 is at a standstill. For example, it can be useful if the first light beam 38 is immediately deactivated upon reaching a stop position 19 that is specified for control-related reasons, see FIG. 1. In this context, it can again be provided that the first light beam 38 is immediately activated in the event of an automatically controlled start of an adjustment movement of the stop finger 17 into a stop position 19. However, it can also be useful if, during an adjustment movement into a stop position 19, the first light beam 38 is deactivated during the adjustment movement, at a distance from the relevant stop position 19 that can be specified for control-related reasons, until the respective stop position 19 is reached. Due to this measure, an unwanted triggering of safety measures can be prevented, for example when, during an approach of the stop finger 17 to the stop position 19, a machine component such as the bottom bending tool 10 shown in FIG. 2 enters the beam path of the first light beam 38 and the monitoring area 41 of the monitoring device 35.

In principle, the first light beam 38 emitted by the illuminating device 36, see FIG. 2, can be composed, for example, of a light cone, light cylinder, or other light beam structure, through which light beam structure a circular or elliptical area or a circular or elliptical line, for example, can be projected as first light image 43 onto an object surface 42 located in the beam path. Basically, any suitable optical elements can be used in combination with the illuminating device 36 to produce the first light beam 38 as long as it is ensured that the first light beam 38 can be radiated into an area ahead of the stop finger 17 during an adjustment movement. If at all possible, this is without a first light image 43 being created on a surface of the machine or of a machine component. For example, the mirror surface 40 shown in FIG. 2 can be arranged to deflect the beam path of the first light beam 38 for this purpose.

It is essential here that a first light image 43 on a surface or object surface 42 of an obstruction can be recognized as quickly as possible and with reliable recognition by the at least one optical detection device 37. In particular, the light radiated by the illuminating device 36 or the first light beam 38 can be monochromatic. In this context, the at least one optical detection device 37 can be designed, for example, specifically for reliable recognition or detection of the light or first light beam 38 emitted by the illumination device 36, in particular for the most reliable detection possible of light with the radiated wavelength. For this purpose, color sensors or photodiodes, for example, would be fundamentally suitable, with it being necessary to ensure that an adequately dimensioned monitoring area for monitoring of the adjustment movements for the stop finger 17 is monitored by corresponding sensors. As already described, an imaging monitoring device 35 or a camera 46 preferably is used or employed for monitoring.

It can be advantageous if the first light beam 38 is radiated into the area ahead of the stop finger 17 as an at least largely parallel light beam 38 whose beam path forms a first, planar light surface 49. In particular, it can be useful that a light beam transverse axis 51 of the first light surface 49 extending transversely to the beam path 48 is at least largely parallel to a contact surface 21 of the stop finger 17. A first light beam of this nature can form an additional light surface 50 that is at least largely parallel to the first light surface, the first light beam 38 being delimited by said light surfaces 49, 50. As described, preferably a first light beam 38 is radiated into the area ahead of the stop finger 17, and the first light surface 49 and additional light surface 50 thereof have the smallest possible perpendicular distance from one another, so that the first light beam 38 is projected onto a planar surface, in particular a planar or flat surface perpendicular to the beam path 48, as a tightly limited strip of light or as a light line. The term beam path 48 also refers here to the respective primary direction of radiation or direction of propagation of the light beam(s) emitted by the illuminating device 36.

A line laser 52, in particular, is suitable for creation or emission of a first light beam 38 of this nature. Therefore, it can be advantageous that the first light beam 38 is radiated into the area ahead of the stop finger 17 in the adjustment direction 39, 45 by means of an illuminating device 36 comprising a line laser 52, as is also shown in FIG. 2. The illuminating device 36 can thus comprise a line laser 52 that is designed for emission of an at least largely parallel first light beam 38 whose beam path 48 is located in a first, planar light surface 49 into the area ahead of the stop finger 17. The line laser 52 here can be arranged such that a light beam transverse axis 51 of the first light surface 49 that is perpendicular to the beam path 48 is oriented to be at least largely parallel to a contact surface 21 of the stop finger 17 in operation of the workpiece processing machine 1, as can best be seen through a combined view of FIG. 2 and FIG. 3.

In addition, it can also be provided that the line laser 52 is arranged such that a transverse extent 53 of the first light surface 49 parallel to the light beam transverse axis 51 in the area of the stop finger 17 is bigger than a width 55 of the stop finger 17 extending between two side edges 54 in operation of the workpiece processing machine 1, as is shown in FIG. 3.

In principle, it is also possible for additional, each possibly differently oriented, light beams to each be radiated into an area ahead of the stop finger 17, depending on the adjustment direction 39, 45. For this purpose, the illuminating device 36 can have, for example, multiple light sources for emission of a respective light beam 38 into the area ahead of the stop finger in the respective adjustment direction 39, 45.

Preferably, a first light beam 38 is radiated into the area ahead of the stop finger 17 in the adjustment direction 39 in such a way that a transverse extent 53 of the first light surface 49 parallel to the light beam transverse axis 51 in the area of the stop finger 17 is bigger than a width 55 of the stop finger 17 extending between two side edges 54. In this way, even object surfaces 42 to the side of the adjustment direction 39 can be detected. Moreover, object surfaces 42 can be detected in the event of an adjustment of the stop finger 17 into different adjustment directions, for example into the adjustment direction 45 illustrated in FIG. 3. As a result, if applicable it is possible to forego radiation of additional differently oriented light beams for monitoring in other adjustment directions. In particular, the first light beam 38 shown in FIG. 3 is radiated into the respective area ahead of the stop finger, both in the event of an adjustment movement of the stop finger in the adjustment direction 39 and in the adjustment direction 45, as a result of the illuminating device 36 that is motion-coupled to the stop finger 17.

Especially for the avoidance of injuries, it is possible to provide that the first light beam 38 is radiated into the area ahead of the stop finger 17 in the adjustment direction 39 at least at a minimum distance 56 from a limiting edge 57 of the stop finger 17 that leads in the adjustment direction 39. The minimum distance 56 can be determined at least by a maximum stopping distance for the stop finger 17 due to control-related and drive-related factors plus a maximum possible position error of the stop finger 17 or of the limiting edge 57 of the stop finger 17. The stopping distance can, in this case, contain or take into account a drive-related braking distance as well as a reaction distance. The reaction distance, in turn, can be determined by the measurement time or measurement cycle time, which is to say the maximum possible time elapsing from the appearance of the first light image 43 on a surface of an obstruction or object surface 42 to the detection of the first light image 43, and by the delays caused by bus cycles and calculation cycles of the control unit 23. The said parameters for setting of the minimum distance 56 must, of course, be individually taken into account or calculated depending on the design of a respective workpiece processing machine 1.

In FIG. 4, an additional, and possibly independent per se, embodiment of the method or of the device is illustrated, wherein the same reference symbols or component designations are again used for the same parts as in the preceding FIGS. 1 to 3. In order to avoid unnecessary repetition, the detailed description in the preceding FIGS. 1 to 3 is referred to or referenced.

In the case of the improvement shown in FIG. 4, it is possible to provide that a second light image 58 is projected by the illuminating device 36 that is motion-coupled to the stop finger 17 onto a surface 59 of the stop finger 17 that is detectable by means of the at least one optical detection device 37. With an illuminating device 36 that is adjustable in a motion-coupled manner with the stop finger 17, see FIG. 2, a second light image 58 of this nature can be continuously detected in the monitoring area 41 of the optical detection device 37. In this way, the monitoring device 35 can be monitored with regard to proper function. In the event that the second light image 58 is not detected in operation of the workpiece processing machine 1, it can be provided that a safety measure is immediately triggered or initiated.

As is shown in FIG. 4, the second light image 58 can be projected onto the surface 59 of the stop finger 17 in the form of a second strip of light 60 that is parallel to a contact surface 21 of the stop finger 17. For example, it can be provided that a line laser 52 is designed for projection onto the surface 59 of the stop finger 17 of a second strip of light 60 that is parallel to a contact surface 21 of the stop finger 17.

As is furthermore shown in FIG. 4, it can additionally be provided that a third strip of light 61 that is parallel to the second strip of light 60 is projected onto the surface 59 of the stop finger 17 at a distance from the second strip of light 60 by the illuminating device 36 that is motion-coupled to the stop finger 17, see FIG. 2. Again, a line laser 52 of the illuminating device 36 can be designed for projection onto the surface 59 of the stop finger 17 of a third strip of light that is parallel to the second strip of light 60 at a distance from the second strip of light.

Also in the case of the second and third linear light images or strips of light 60, 61 shown in FIG. 4, it can be provided that the second strip of light 60 and the third strip of light 61 are created by a second light beam 62 or a third light beam 63, respectively. Again, for reasons of better clarity, the corresponding second light beam 62 and the third light beam 63, respectively, are only shown in the image plane of the second strip of light 60 or the third strip of light 61, respectively, in FIG. 4. From the advantageous aspects already described on the basis of the first light beam 38, the second light beam 62 and/or the third light beam 63 can have a second transverse extent 64 or third transverse extent 65, respectively, which transverse extents 64, 65 can be chosen to be bigger than a width 55 of the stop finger 17.

The illuminating device 36 or the line laser 52 shown can also each be calibratable, including with regard to position and/or orientation, for orientation of the first light beam 38, and if applicable for positioning of the second and third strips of light 60, 61 on the surface 59 of the stop finger 17.

In addition, provision can be made to identify or computationally determine the position of the stop finger 17 from the visually detected location or position of the second strip of light 60 and/or third strip of light 61 in the monitoring area 41. This is possible with a known position and orientation of the imaging detection device(s) 37, and thus with known coordinates, such as a machine coordinate system in the monitoring area 41, at least along an image plane parallel to the surface 59 of the stop finger 17. Any inaccuracies resulting from slight adjustment movements or positions of a stop finger 17 in the vertical direction, which is to say along the R-axis direction 26, see FIG. 1 and FIG. 2, should be taken into account if applicable. However, such possible position detection inaccuracies can fundamentally be corrected computationally on the basis of the position of a stop finger 17 in the R-axis direction 26, which is known at all times for control-related reasons.

Lastly, in the event of projection of a second strip of light 60 and a separated third strip of light 61 on the surface 59 of the stop finger 17, a visually detected apparent perpendicular distance 66 between the second strip of light 60 and the third strip of light 61 can also be used for determination of a position of the stop finger 17. For example, the distance between a limiting edge 57 of the stop finger 17 on the workpiece feed side and the camera 46 can be determined computationally in this way, because the apparent perpendicular distance 66 can change with the distance from the camera 46, at least in the direction of view of the camera 46. Of course, this applies in turn for the second and third strips of light 60, 61, at least for adjustment movements of the stop finger in the image plane.

The exemplary embodiments show possible embodiment variants, wherein it must be noted here that the invention is not restricted to the embodiment variants specifically shown, but rather various combinations of the individual embodiment variants with one another are also possible, and this possibility for variation lies within the ability of a person skilled in the art of this technical field, on the basis of the teaching for technical action provided by the present invention.

The scope of protection is determined by the claims. However, the description and the drawings must be referred to for an interpretation of the claims. Individual characteristics or combinations of characteristics of the different exemplary embodiments that are shown and described can represent independent inventive solutions on their own. The task on which the independent inventive solutions are based can be derived from the description.

All information regarding value ranges in the present description should be understood to include any and all subranges thereof, for example the specification 1 to 10 should to be understood to mean that all subranges, taking the lower limit 1 and the upper limit 10 as a starting point, are also included, which is to say that all subranges start with a lower limit of 1 or higher and end with an upper limit of 10 or less, for example, 1 to 1.7, or 3.2 to 8.1, or 5.5 to 10.

As a matter of form, it should be noted in conclusion that, for a better understanding of the structure, some elements were shown not to scale and/or greater in size and/or smaller in size.

REFERENCE SYMBOL LIST 1 workpiece processing machine
2 bending machine
3 press brake
4 workpiece
5 base surface
6 bench beam
7 press beam
8 drive means
9 hydraulic cylinder
10 bending tool
11 bending tool
12 tool holder
13 face
14 tool holder
15 face
16 stop device
17 stop finger
18 press space
19 stop position
20 workpiece feed side
21 contact surface
22 adjustment axis
23 control device
24 X-axis direction
25 Z-axis direction
26 R-axis direction
27 support surface
28 bending plane
29 drive arrangement
30 guideway
31 servomotor
32 pinion
33 guideway
34 bracket
35 monitoring device
36 illuminating device
37 detection device
38 light beam
39 adjustment direction
40 mirror surface
41 monitoring area
42 object surface
43 light image
44 monitoring area 45 adjustment direction
46 camera
47 retraction movement
48 beam path
49 light surface
50 light surface
51 light beam transverse axis
52 line laser
53 transverse extent
54 side edge
55 width
56 minimum distance
57 limiting edge
58 light image
59 surface
60 strip of light
61 strip of light
62 light beam
63 light beam
64 transverse extent
65 transverse extent
66 perpendicular distance

The invention claimed is:

1. A method for operation of a workpiece processing machine (1), comprising
performing an automatically controlled adjustment movement of at least one stop finger (17) of a stop device (16) along at least one driven adjustment axis (22) into a stop position (19) provided for positioning of a workpiece (4),
placing the workpiece (4) against a contact surface (21) of the at least one stop finger (17) to position the workpiece,
during the automatically controlled adjustment movement of the at least one stop finger (17), using an illuminating device (36) motion-coupled to the stop finger (17) along the at least one driven adjustment axis (22) to radiate a first light beam (38) into an area ahead of the at least one stop finger (17) in an adjustment direction (39, 45),
using at least one stationary optical detection device (37) to monitor a monitoring area (41) for adjustment movements of the at least one stop finger (17),
initiating an automatically controlled safety measure when a first light image (43) projected by the first light beam (38) onto an object surface (42) is detected.

2. The method according to claim 1, wherein the illuminating device (36) is adjusted with the stop finger (17) in a motion-coupled manner at least along two adjustment axes (22).

3. The method according to claim 2, wherein the first light beam (38) is directed into the area ahead of the stop finger (17) in the adjustment direction (39, 45) by an optical mirror surface (40).

4. The method according to claim 1, wherein the first light beam (38) is radiated into the area ahead of the stop finger (17) as an at least largely parallel light beam (38) whose beam path (48) forms a first, planar light surface (49).

5. The method according to claim 4, wherein the first light beam (38) is radiated into the area ahead of the stop finger (17) in the adjustment direction (39) such that a light beam transverse axis (51) of the first light surface (49) extending transversely to the beam path (48) is at least largely parallel to a contact surface (21) of the stop finger (17).

6. The method according to claim 5, wherein the first light beam (38) is radiated into the area ahead of the stop finger (17) in the adjustment direction (39) such that a transverse extent (53) of the first light surface (49) parallel to the light beam transverse axis (51) in the area of the stop finger (17) is bigger than a width (55) of the stop finger (17) extending between two side edges (54).

7. The method according to claim 4, wherein the illuminating device (36) comprises a line laser (52).

8. The method according to claim 1, wherein the first light beam (38) is radiated into the area ahead of the stop finger (17) in the adjustment direction (39) at least at a minimum distance (56) from a limiting edge (57) of the stop finger (17) that leads in the adjustment direction (39).

9. The method according to claim 1, wherein the illuminating device (36) is not adjusted in the direction of a vertical adjustment axis (22) that is perpendicular to a base surface (5).

10. The method according to claim 1, wherein a second light image (58) is projected by the illuminating device (36) that is motion-coupled to the stop finger (17) onto a surface (59) of the stop finger (17) that is detectable by means of the at least one optical detection device (37).

11. The method according to claim 10, wherein the second light image (58) has a linear edge parallel to a contact surface (21) of the stop finger (17).

12. The method according to claim 11, wherein a third light image (61) having a linear edge that is parallel to the linear edge of the second light image is projected onto the surface (59) of the stop finger (17) at a distance from the second strip of light (60) by the illuminating device (36) that is motion-coupled to the stop finger (17).

13. The method according to claim 12, wherein a position of the stop finger (17) is determined computationally from the visually detected location of the second light image and/or the third light image (61) in the monitoring area (41).

14. The method according to claim 1, wherein the monitoring area (41) is monitored by means of at least one stationary imaging camera (46).

15. The method according to claim 14, wherein a distance between a limiting edge (57) of the stop finger (17) on a workpiece feed side and the camera (46) is determined computationally from a visually detected, apparent perpendicular distance (66) between the second strip of light (60) and the third strip of light (61).

16. The method according to claim 1, wherein the first light beam (38) is immediately activated in the event of an automatically controlled start of an adjustment movement of the stop finger (17) into a stop position (19).

17. The method according to claim 1, wherein the first light beam (38) is immediately deactivated upon reaching a selected stop position (19).

18. The method according to claim 1, wherein, during an adjustment movement into a selected stop position (19), the first light beam (38) is deactivated during the adjustment movement, at a distance from the stop position (19) until the stop position (19) is reached.

19. The method according to claim 1, wherein the first light beam (38) is deactivated when the stop finger (17) is at a standstill.

20. The method according to claim 1, wherein an immediate retraction movement of the stop finger (17) is triggered as an automatically controlled safety measure.

21. The method according claim 1, wherein no automatically controlled safety measure is triggered when the stop finger (17) is at a standstill.

22. The method according to claim 1, wherein the first light beam (38) is radiated into the area ahead of the stop finger (17) during an adjustment movement of the stop finger (17) into a stop position (19) performed along a horizontal adjustment axis (22) in the direction of a workpiece feed side (20).

23. A workpiece processing machine (1), comprising:
an automatically controlled stop device (16), comprising at least one automatically controlled stop finger (17) that is displaceable along at least one driven adjustment axis (22) and has at least one contact surface (21) intended for placement of a tool to be formed in a stop position (19),
a control device (23) for automatic control of adjustment movements of the stop finger (17) along the at least one adjustment axis (22),
a monitoring device (35) connected by signaling means to the control device (23) and comprising an illuminating device (36) and at least one optical detection device (37),
wherein the illuminating device (36) is arranged to be motion-coupled to the stop finger (17), and is configured to radiate a first light beam (38) into an area ahead of the stop finger (17) in the adjustment direction (39, 45) during an automatically controlled adjustment movement of the at least one stop finger (17) in operation of the workpiece processing machine (1), and
wherein the at least one detection device (37) is arranged to be stationary for monitoring of a monitoring area (41), and is configured to detect a first light image (43) created when the first light beam (38) is incident on an object surface (42), and
wherein the control device (23) is configured to trigger at least one safety measure in the event the first light beam (38) is activated and detection of the first light image (43) by the at least one optical detection device (37) takes place during the adjustment movement of the stop finger (17).

24. The workpiece processing machine according to claim 23, wherein the illuminating device (36) is arranged to be adjustable in a motion-coupled manner with the stop finger (17) at least along two driven adjustment axes (22).

25. The workpiece processing machine according to claim 23, wherein an optical mirror surface (40) is arranged for orientation of the first light beam (38) into the area ahead of the stop finger (17).

26. The workpiece processing machine according to claim 25, wherein the mirror surface (40) extends over the entire length of a bench beam (6) implemented on the workpiece processing machine (1).

27. The workpiece processing machine according to claim 23, wherein the illuminating device (36) comprises a line laser (52) that is configured to emit, into the area ahead of the stop finger (17), an at least largely parallel first light beam (38) whose beam path (48) is located in a first, planar light surface (49).

28. The workpiece processing machine according to claim 27, wherein the line laser (52) is arranged such that a light beam transverse axis (51) of the first light surface (49) that is perpendicular to the beam path (48) is at least largely parallel to a contact surface (21) of the stop finger (17) in operation of the workpiece processing machine (1).

29. The workpiece processing machine according to claim 27, wherein the line laser (52) is arranged such that a transverse extent (53) of the first light surface (49) parallel to the light beam transverse axis (51) in the area of the stop finger (17) is bigger than a width (55) of the stop finger (17) extending between two side edges (54) in operation of the workpiece processing machine (1).

30. The workpiece processing machine according to claim 27, wherein the line laser (52) is configured to project onto the surface (59) of the stop finger (17) of a second strip of light (60) parallel to a contact surface (21) of the stop finger (17).

31. The workpiece processing machine according to claim 30, wherein the line laser (52) is configured to project onto the surface (59) of the stop finger (17) a third strip of light (61) that is parallel to the second strip of light (60) at a distance from the second strip of light (60).

32. The workpiece processing machine according to claim 23, wherein the at least one optical detection device (37) comprises a stationary imaging camera (46).

33. The workpiece processing machine according to claim 23, wherein the illuminating device (36) is not motion-coupled to the stop finger (17) along a vertical adjustment axis (22) that is perpendicular to a base surface (5).

34. The workpiece processing machine according to claim 23, wherein at least one horizontal, driven adjustment axis (22) is provided for automatically controlled adjustment of the at least one stop finger (17) in the direction of a workpiece feed side (20) into the stop position (19).

* * * * *